(12) United States Patent
Liang et al.

(10) Patent No.: US 12,056,518 B2
(45) Date of Patent: Aug. 6, 2024

(54) NOTIFYING MEMORY SYSTEM OF HOST EVENTS VIA MODULATED RESET SIGNALS

(71) Applicant: Micron Technology, Inc., Boise, ID (US)

(72) Inventors: Qing Liang, Boise, ID (US); Jonathan S. Parry, Boise, ID (US); Kulachet Tanpairoj, Santa Clara, CA (US); Stephen Hanna, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/959,724

(22) Filed: Oct. 4, 2022

(65) Prior Publication Data

US 2023/0027877 A1 Jan. 26, 2023

Related U.S. Application Data

(63) Continuation of application No. 16/889,029, filed on Jun. 1, 2020, now Pat. No. 11,513,835.

(51) Int. Cl.
*G06F 9/48* (2006.01)
*G06F 12/08* (2016.01)
*G06F 12/0875* (2016.01)

(52) U.S. Cl.
CPC .......... *G06F 9/485* (2013.01); *G06F 12/0875* (2013.01); *G06F 2212/1041* (2013.01)

(58) Field of Classification Search
CPC ................ G06F 9/485; G06F 12/0875; G06F 2212/1041
See application file for complete search history.

(56) References Cited

U.S. PATENT DOCUMENTS

| | | | |
|---|---|---|---|
| 2004/0095020 A1 | 5/2004 | Kernahan | |
| 2006/0059286 A1* | 3/2006 | Bertone | G06F 9/30043 710/260 |
| 2006/0139681 A1 | 6/2006 | Walmsley | |
| 2010/0290292 A1 | 11/2010 | Tanizaki | |
| 2016/0026406 A1* | 1/2016 | Hahn | G06F 3/0685 711/103 |
| 2017/0187218 A1* | 6/2017 | Thomsen | H02J 7/00 |
| 2018/0349297 A1 | 12/2018 | Wilson | |
| 2019/0114218 A1 | 4/2019 | Yun | |
| 2019/0121647 A1* | 4/2019 | Por | G06F 9/4411 |

(Continued)

FOREIGN PATENT DOCUMENTS

WO    WO9812633 A1    3/1998

OTHER PUBLICATIONS

PCT Notification Concerning Transmittal of International Preliminary Report on Patentability for PCT Application No. PCT/US2021/034451, mailed Dec. 15, 13 pages.

(Continued)

*Primary Examiner* — Masud K Khan
(74) *Attorney, Agent, or Firm* — Lowenstein Sandler LLP

(57) ABSTRACT

An example memory sub-system includes a memory device and a processing device, operatively coupled to the memory device. The processing device is configured to receive a reset signal from a host computer system in communication with the memory system; identify, by decoding the reset signal, a host event specified by the reset signal; and process the identified host event.

17 Claims, 8 Drawing Sheets

(56) References Cited

U.S. PATENT DOCUMENTS

2019/0372566 A1    12/2019  Leyrer
2020/0104138 A1     4/2020  Chheda
2020/0192804 A1*    6/2020  Lee ..................... G06F 11/1441

OTHER PUBLICATIONS

USPTO, Office Action for U.S. Appl. No. 16/889,029, mailed on Dec. 27, 2021.
USPTO, Final Office Action for U.S. Appl. No. 16/889,029, mailed on Jun. 1, 2020.
USPTO, Notice of Allowance for U.S. Appl. No. 16/889,029, mailed Jul. 13, 2022.
PCT Notification of Transmittal of the International Search Report and the Written Opinion of the International Searching Authority for PCT Application No. PCT/US2021/034451, mailed Oct. 6, 2021, 20 pages.

* cited by examiner

US 12,056,518 B2

NOTIFYING MEMORY SYSTEM OF HOST EVENTS VIA MODULATED RESET SIGNALS

REFERENCE TO RELATED APPLICATIONS

This application is a continuation of U.S. patent application Ser. No. 16/889,029 filed on Jun. 1, 2020, which is incorporated by reference herein.

TECHNICAL FIELD

Embodiments of the disclosure are generally related to memory sub-systems, and more specifically, are related to notifying memory system of host events via modulated reset signals.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of some embodiments of the disclosure.

DETAILED DESCRIPTION

Figure 1:
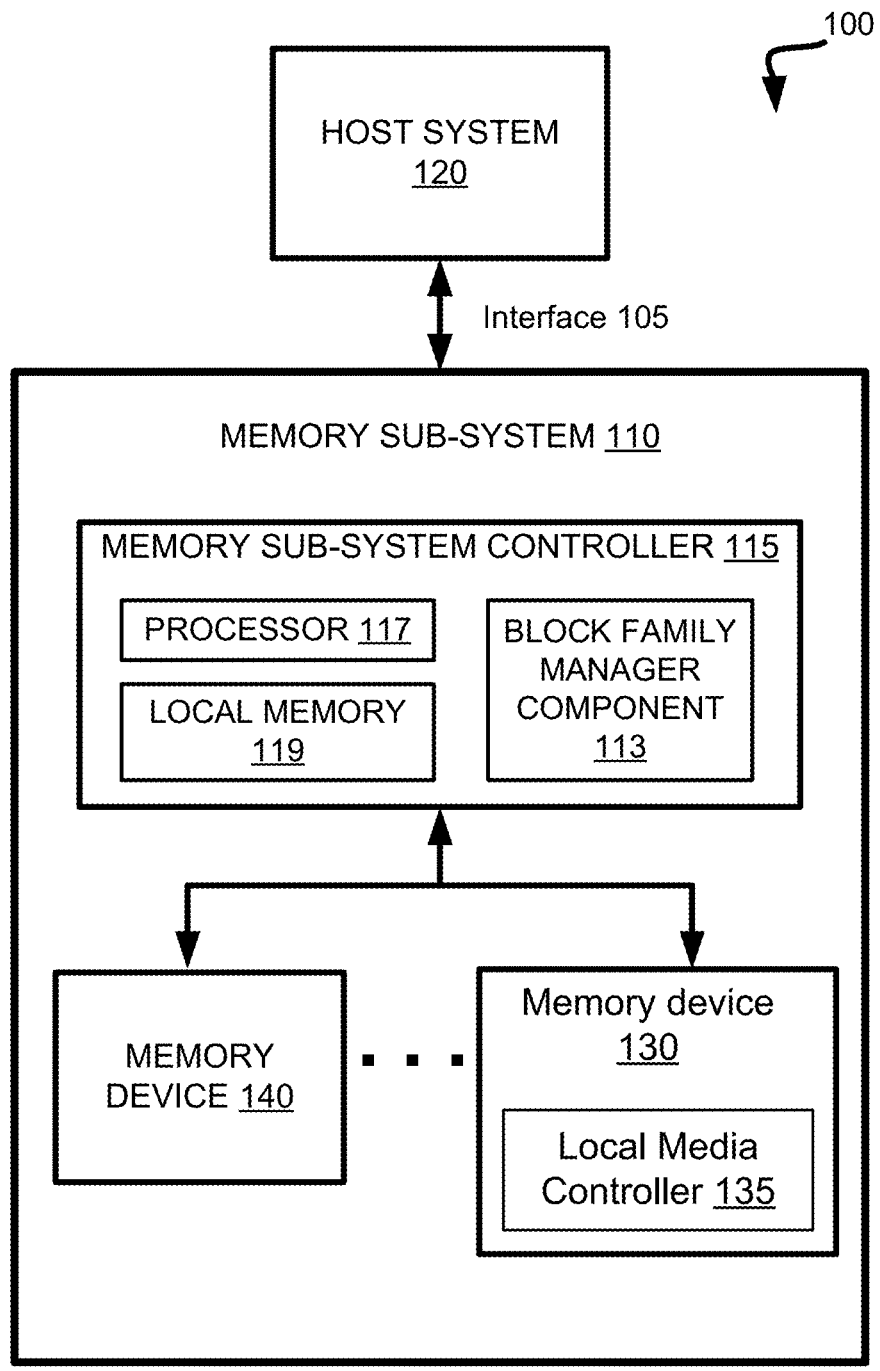
FIG. 1 illustrates an example computing system that includes a memory sub-system in accordance with some embodiments of the present disclosure.

Embodiments of the present disclosure are directed to notifying a memory sub-system of host events via modulated reset signals. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information.

The memory sub-system can perform host-initiated data operations. For example, the host system can initiate a data operation (e.g., write, read, erase, etc.) on a memory sub-system. The host system can send access requests (e.g., write command, read command) to the memory sub-system, such as to store data on a memory device at the memory sub-system and to read data from the memory device on the memory sub-system. The data to be read or written, as specified by a host request, is hereinafter referred to as "host data". A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

The host system can communicate with the memory-subsystem by using a specified protocol, which can support a limited set of commands, such as write, read, erase, configure, etc. The communications are performed via a set of interface signals supported by the host system and the memory sub-system.

Various common implementations of the communication interface between the host system and the memory sub-system fail to support certain event notifications from the host to the memory sub-system. For example, if a mobile device acting as the host system would be able to notify the memory sub-system that the battery of the mobile device is currently being charged, the memory sub-system could perform cache management operations to clean up its internal caches, under the assumption that the amount of host-initiated data operations is minimal while the host system is connected to the charger and therefore is unlikely to be utilized by the user.

Accordingly, embodiments of the present disclosure implement event signaling between the host system and the memory sub-system via the reset signal of the memory sub-system, while supporting the conventional reset signaling over the reset pin, thus significantly improving various operational aspects of the memory sub-system. In accordance with embodiments of the present disclosure, the host system can modulate the memory sub-system reset signal according to a set of predefined patterns, such that each of the predefined patterns would correspond to a certain host event and/or cause the memory sub-system to perform certain actions. Accordingly, the host system can utilize a certain reset signal pattern for signaling a corresponding host event to the memory sub-system, thus causing the memory sub-system to perform event-specific processing.

For example, the host system can utilize a predefined reset signal pattern (e.g., 10101010 binary) for signaling the host battery charging event to the memory sub-system, thus causing the memory sub-system to perform cache management operations in order to clean up its internal caches.

In another example, the host system can utilize another predefined reset signal pattern (e.g., 01010101 binary) for signaling expiration of a timeout for awaiting a response from the memory sub-system, thus causing the memory sub-system to abort the current memory access operation and/or save its current state to a non-volatile memory device for debugging. The saved memory subs-system state information can then be retrieved and used by the host system in order to determine the reason for the failure that manifested itself in the memory sub-system becoming unresponsive.

In yet another example, the host system can utilize yet another predefined reset signal pattern (e.g., 00110011 binary) for signaling a programmable predefined event to the memory sub-system, thus causing the memory sub-system to perform programmable event-specific processing by executing an event-specific code, as described in more detail herein below.

As noted herein above, embodiments of the present disclosure support the conventional reset signaling over the reset pin, thus allowing the host system to drive the reset signal to a predefined state for at least a predefined period of time (which would exceed the characteristic times used in the above-described reset signal patterns) in order to cause the memory sub-system to perform the reset sequence. Accordingly, legacy host systems that do not support the above-described reset signal patterns would still be able to perform conventional reset signaling, while host systems that are able to support the reset signal patterns would be capable of perform both conventional reset signaling or utilizing the reset pin for enhanced signaling in accordance with embodiments of the present disclosure.

Therefore, advantages of the systems and methods implemented in accordance with some embodiments of the present disclosure include, but are not limited to, improving the memory sub-system efficiency by signaling host events to the memory sub-system without modifying the hardware interface, as described in more detail herein below.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface 105. The physical host interface 105 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

The memory sub-system 110 includes a host event notification component 113 that can be used to process host events transmitted via modulated reset signals in accordance with embodiments of the present disclosure. In some embodiments, the controller 115 includes at least a portion of the host event notification component 113. For example, the controller 115 can include a processor 117 configured to execute instructions stored in local memory 119 for performing the operations described herein. In some embodiments, the host event notification component 113 is part of the host system 120, an application, or an operating system. The host event notification component 113 can match the payload carried by the reset signal to one of a predefined bit sequences identifying respective host events and perform event-specific processing, as described in more detail herein below.

Figure 2:
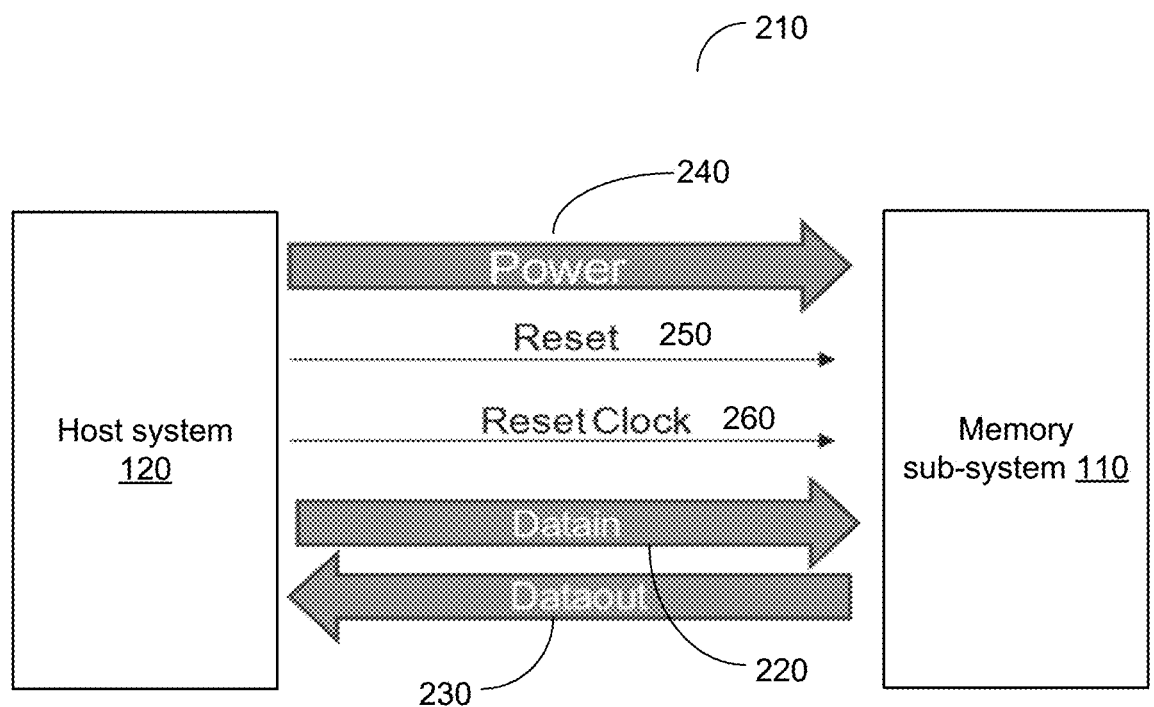
FIG. 2 schematically illustrates an example interface between the host system and the memory sub-system, implemented in accordance aspects of the present disclosure.

FIG. 2 schematically illustrates the example interface 210 between the host system 120 and the memory sub-system 110, implemented in accordance aspects of the present disclosure. As noted herein above, the interface 210 can be utilized for transmitting control, address, data, and other signals between the host system 120 and the memory sub-system 110. In an illustrative example, the interface 210 can be compliant to NVM Express (NVMe) interface specification. As schematically illustrated by FIG. 2, the interface 210 can include a set of DataIn signals 220 for transmitting data from the host system 120 to the memory sub-system 110. The interface 210 can further include a set of DataOut signals 230 for transmitting data from the memory sub-system 110 to the host system 120. The interface 210 can further include a set of power lines and power management signals 240 for transmitting the power and/or power management commands from the host system 120 to the memory sub-system 110. The interface 210 can further include a reset signal 250, which can be utilized for notifying the memory sub-system 110 of host events thus causing the memory sub-system 110 to perform event-specific processing. In some implementations, the host system 120 and the memory sub-system 110 may synchronize their clocks based on the reset clock signal 260, which is a periodic signal (e.g., switching between logical "zero" and logical "one" states every 100 microseconds). Alternatively, if no reset clock signal 260 is present in the interface 210, the memory sub-system may implement a universal asynchronous receiver/transmitted interface (UART), which, instead of a clock signal, adds start and stop bits to the data packets being transferred, as described below with references to FIG. 4.

Figure 3:
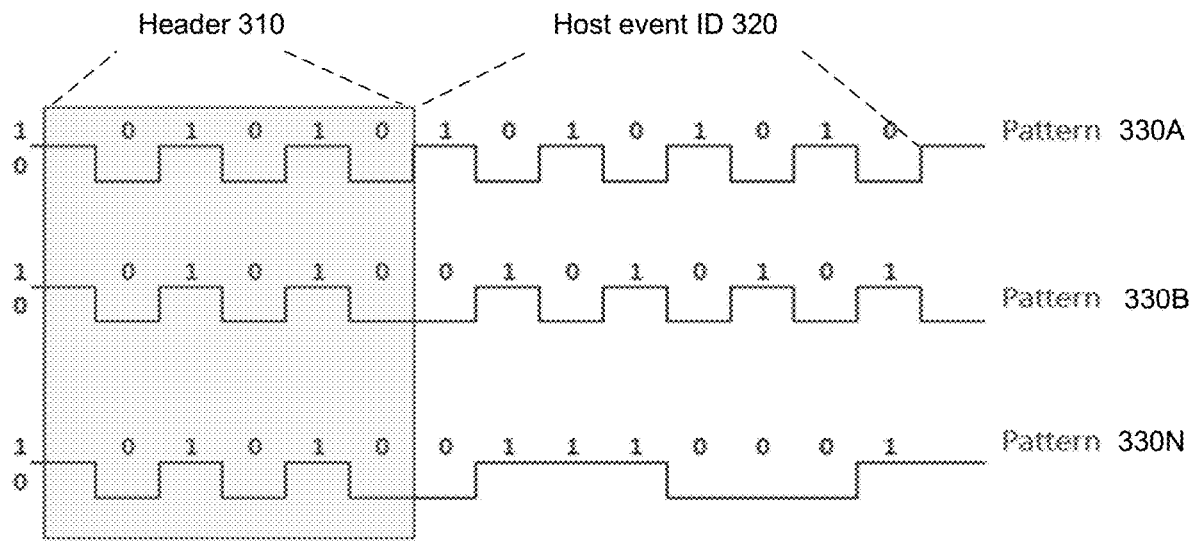
FIG. 3 schematically illustrates examples of modulated reset signals transmitted to the memory sub-system by the host system operating in accordance with aspects of the present disclosure.

FIG. 3 schematically illustrates examples of modulated reset signals transmitted to the memory sub-system by the host system operating in accordance with aspects of the present disclosure. As schematically illustrated by FIG. 3, The reset signal can include the header 310, which can be represented by a predefined bit sequence, followed by a variable bit sequence serving as the host event identifier 320. The host event identifier 320 can be one of the predefined bit sequences 330A-330N, such that each of the predefined bit sequences would correspond to a certain host event and/or cause the memory sub-system to perform certain actions. Accordingly, the host system can utilize a certain reset signal pattern for signaling a corresponding host event to the memory sub-system, thus causing the memory sub-system to perform event-specific processing.

For example, the host system can utilize the predefined reset signal pattern 330A (e.g., 10101010 binary) for signaling the host battery charging event to the memory sub-system, thus causing the memory sub-system to perform cache management operations in order to clean up its internal caches. The host battery charging event can be signaled to the memory sub-system responsive to detecting an external power source connection to the host system.

In some implementations, the memory sub-system can include one or more non-volatile memory devices, such as NAND flash devices (e.g., device 130 of FIG. 1) and one or more volatile memory devices, such as dynamic random access memory (DRAM) devices (e.g., device 140 of FIG. 1). Volatile memory devices can exhibit access times that are by several orders of magnitude less than access times of non-volatile memory devices. Accordingly, the memory sub-system can allocate one or more portions of a volatile memory device 140 to act as a cache for one or more non-volatile memory devices 130. In an illustrative example, portions of host data retrieved from a non-volatile memory device 130 can be cached on a volatile memory device 140. In another example, portions of memory sub-system metadata (such as flash translation metadata including logical-to-physical (L2P) tables mapping host logical addresses to corresponding memory device physical addresses) can be cached on a volatile memory device 140.

The memory sub-system can implement different cache policies. Under a write-through policy, all write operations performed with respect to cache entries are immediately propagated to the non-volatile memory. Conversely, a write-back policy can involve delaying the non-volatile memory updates, thus improving the overall memory access efficiency at least for some memory access patterns. Accordingly, responsive to receiving a notification of the host battery charging event, the memory sub-system can perform cache management operations, such as writing back the content of modified cache entries to the non-volatile memory.

Referring again to FIG. 3, in another example, the host system can utilize another predefined reset signal pattern 330B (e.g., 01010101 binary) for signaling expiration of a timeout for awaiting a response from the memory sub-system to a host command (such as read or write command). Responsive to matching the reset signal payload to the reset signal pattern 330B, the memory sub-system can abort the current memory access operation and/or save its current state to a non-volatile memory device for debugging. The saved memory subs-system state can include the content of the registers and memory buffers utilized by the memory sub-system controller 115. The saved memory subs-system state information can then be retrieved and used by the host system in order to determine the reason for the failure that manifested itself in the memory sub-system becoming unresponsive.

In yet another example, the host system can utilize yet another predefined reset signal pattern 330N (e.g., 01110001 binary) for signaling a programmable predefined event to the memory sub-system, thus causing the memory sub-system to perform programmable event-specific processing by executing event-specific code. In some implementations, the memory sub-system controller can maintain a memory data structure (e.g., a two-dimensional array) that includes one or more host event mapping records, such that each host event mapping record maps the host event identifier to a corresponding memory address that serves as an entry point of the event handler code to be executed by the memory sub-system controller responsive to determining that the reset signal payload includes a bit sequence matching the host event identifier.

Figure 4:
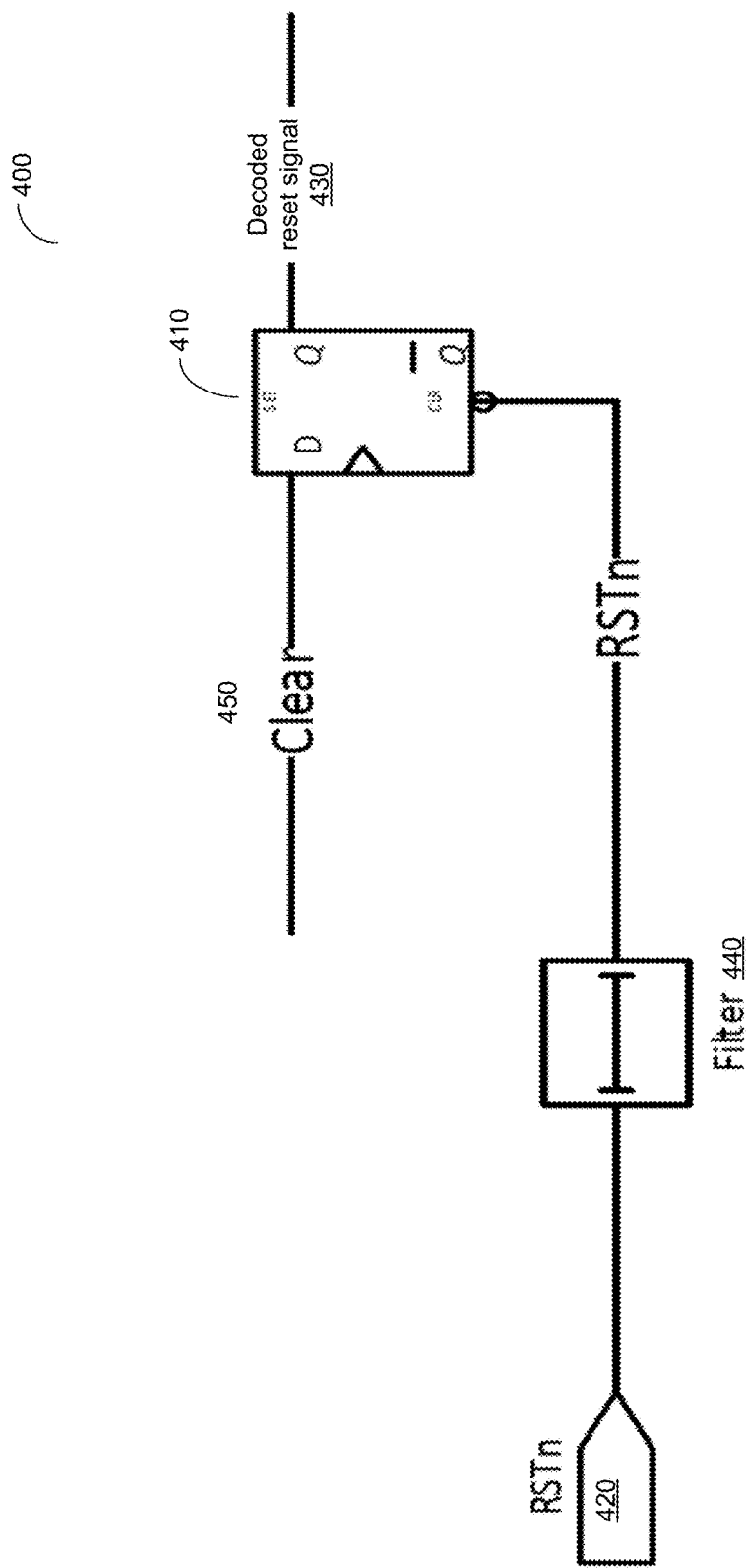
FIG. 4 schematically illustrates an example reset signal decoder circuit of the memory sub-system operating in accordance with aspects of the present disclosure.
Figure 5:
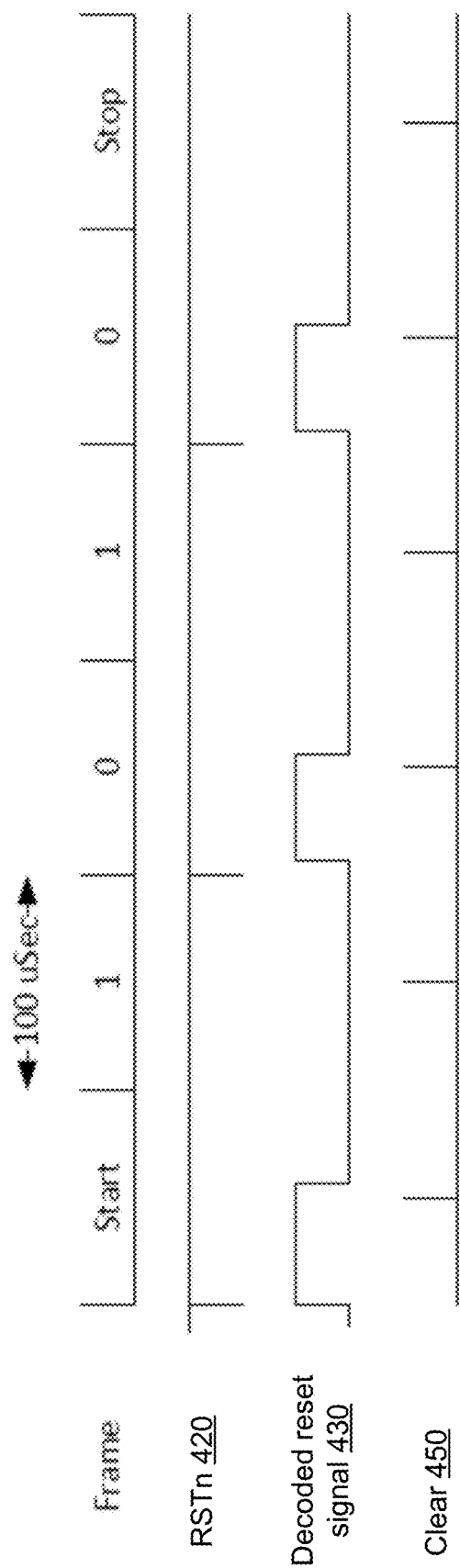
FIG. 5 schematically illustrates an example signal timing diagram utilized by the memory sub-system operating in accordance with aspects of the present disclosure.

FIG. 4 schematically illustrates an example reset signal decoder circuit of the memory sub-system operating in accordance with aspects of the present disclosure. As shown by FIG. 4, the reset signal decoder circuit 400 may implement a UART interface by employing a latch circuit 410 configured to output the decoded reset signal 430 responsive to detecting the input RSTn signal 420 transitioning to the low level (logical "zero"). The input RSTn signal 420 can be filtered by the digital filter 440, which can only pass the pulses having the width exceeding a predetermined number of clock cycles (or a predetermined number of nanoseconds), thus preventing the latch circuit 410 from latching a random spike of the input reset signal 420. Accordingly, as schematically illustrated by FIG. 5, when the input RSTn signal 420 goes from the logical "one" to the logical "zero," the decoded reset signal 430 produced by the latch circuit 410 becomes logical "one," and stays at the logical "one" level until it gets reset by the clear signal 450. The memory sub-system controller receives the decoded reset signal 430, verifies that the signal header matches the predefined bit pattern for the reset signal, and attempts to match the payload carried by the reset signal to one of a predefined bit sequences identifying respective host events. Upon successfully matching the reset signal payload to a predefined bit sequence, the memory sub-system can perform event-specific processing for the host event referenced by the predefined bit sequence that matches the reset signal payload, as described in more detail herein above with references to FIGS. 2-3.

Figure 6:
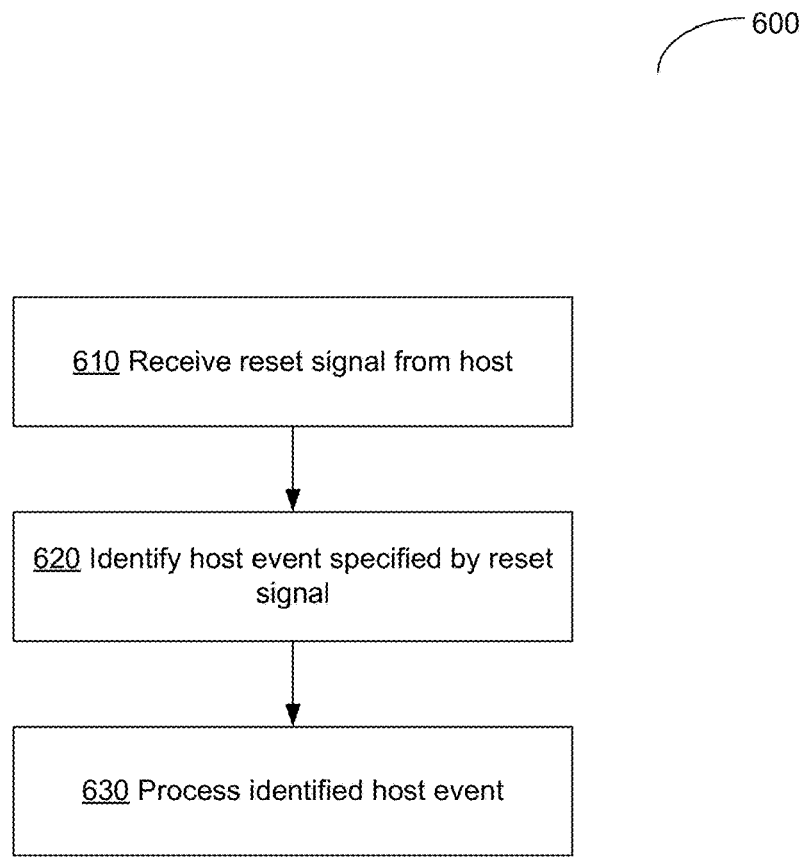
FIG. 6 is a flow diagram of an example method of processing host events specified by the reset signal, implemented by a memory sub-system controller operating in accordance with some embodiments of the present disclosure.

FIG. 6 is a flow diagram of an example method of processing host events specified by the reset signal, implemented by a memory sub-system controller operating in accordance with some embodiments of the present disclosure. The method 600 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 is performed by the host event notification component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 610, the memory sub-system controller receives a reset signal from the host computer system. In an illustrative example, the reset signal may be produced by a reset signal decoder circuit producing the reset signal by latching a logical transition on the input RSTn line, as described in more detail herein above.

At operation 620, the memory sub-system controller identifies a host event specified by the reset signal. In an illustrative example, the memory sub-system controller verifies that the signal header matches the predefined bit pattern for the reset signal, and attempts to match the payload carried by the reset signal to one of a predefined bit sequences identifying respective host events.

Upon successfully matching the reset signal payload to a predefined bit sequence, the memory sub-system controller, at operation 630, performs event-specific processing for the host event referenced by the predefined bit sequence that matches the reset signal payload. In an illustrative example, the memory sub-system controller maintains a memory data structure (e.g., a two-dimensional array) that includes one or more host event mapping records, such that each host event mapping record maps the host event identifier (encoded by the payload of the reset signal) to a corresponding memory address that serves as an entry point of the event handler code to be executed by the memory sub-system controller.

In an illustrative example, the host event code references a battery charging event, thus causing the memory sub-system to perform a cache management operation with respect to the memory sub-system cache. In another illustrative example, the host event code references a communication timeout expiration event, thus causing the memory sub-system to store, on the memory device, at least part of the memory sub-system state (e.g., content of the registers and memory buffers utilized by the memory sub-system controller). In yet another illustrative example, the host event code references a programmable predefined event, thus causing the memory sub-system to perform event-specific processing by executing an event-specific code.

Responsive to completing operation 630, the method terminates.

Figure 7:
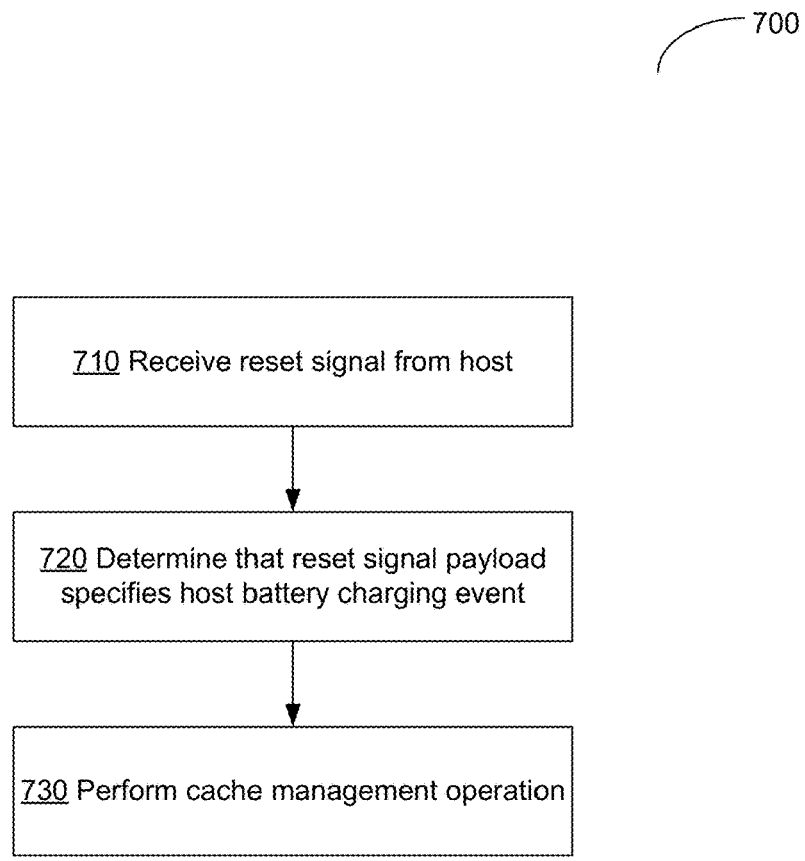
FIG. 7 is a flow diagram of an example method of performing cache management responsive to receiving a host event notification via the reset signal, implemented by a memory sub-system controller operating in accordance with some embodiments of the present disclosure.

FIG. 7 is a flow diagram of an example method of performing cache management responsive to receiving a host event notification via the reset signal, implemented by a memory sub-system controller operating in accordance with some embodiments of the present disclosure. The method 700 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 700 is performed by the host event notification component 113 of FIG. 1. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible.

At operation 710, the memory sub-system controller receives a reset signal from the host computer system. In an illustrative example, the reset signal may be produced by a reset signal decoder circuit producing the reset signal by latching a logical transition on the input RSTn line, as described in more detail herein above.

At operation 720, the memory sub-system controller determines that the payload of the reset signal specifies the host battery charging event. In an illustrative example, the memory sub-system controller verifies that the signal header matches the predefined bit pattern for the reset signal, and attempts to match the payload carried by the reset signal to one of a predefined bit sequences identifying respective host events, as described in more detail herein above.

Upon successfully matching the reset signal payload to a predefined bit sequence corresponding to the host battery charging event, the memory sub-system controller, at operation 730, performs a cache management operation with respect to the memory sub-system cache. In an illustrative example, the memory sub-system controllers writes the content of modified cache entries to the non-volatile memory device, as described in more detail herein above.

In an illustrative example, the reset signal payload further references a communication timeout expiration event, thus causing the memory sub-system to store, on the memory device, at least part of the memory sub-system state (e.g., content of the registers and memory buffers utilized by the memory sub-system controller). In another illustrative example, the reset signal payload further references a programmable predefined event, thus causing the memory sub-system to perform event-specific processing by executing an event-specific code.

Responsive to completing operation 730, the method terminates.

Figure 8:
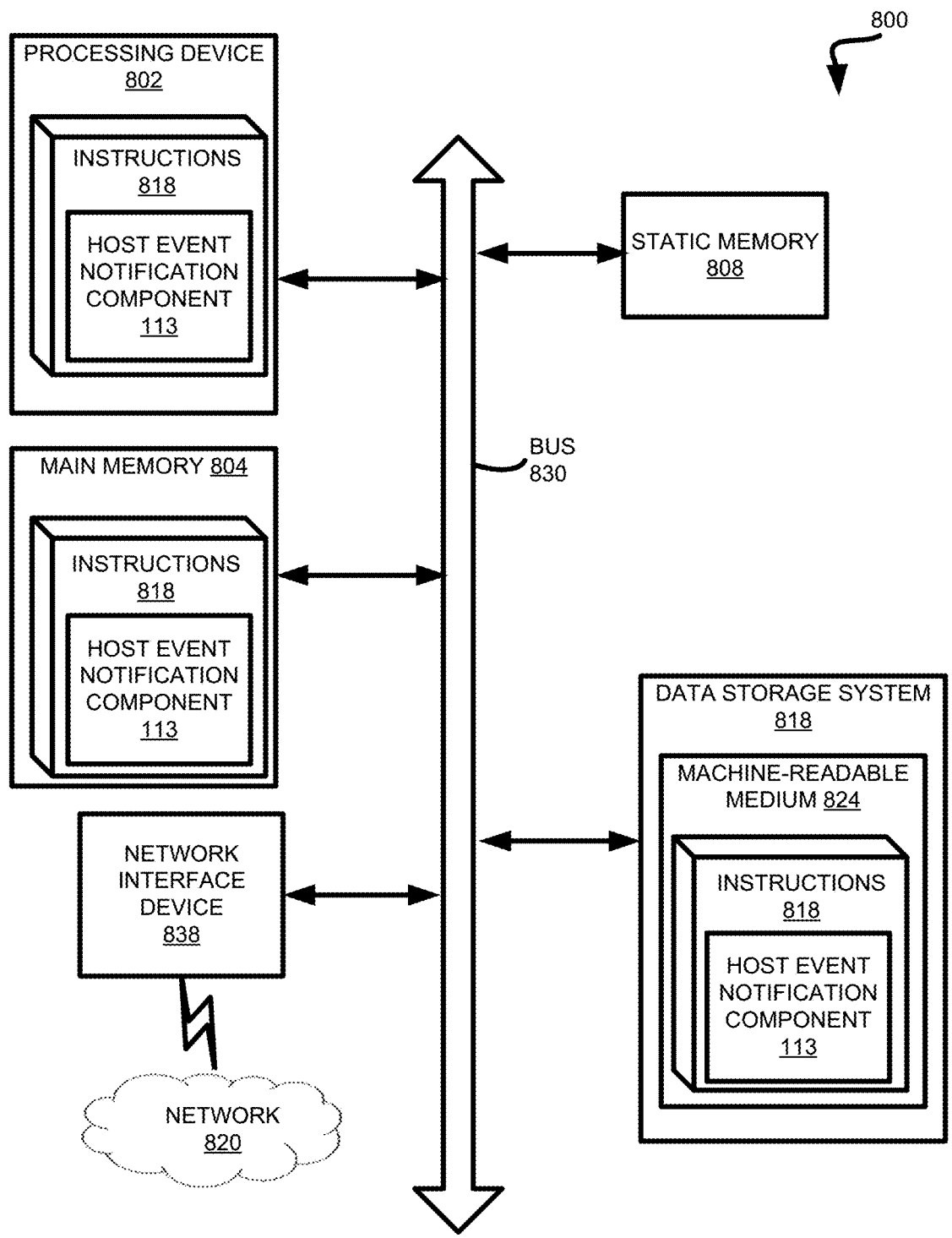
FIG. 8 is a block diagram of an example computer system in which embodiments of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the host event notification component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 808 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 828 for performing the operations and steps discussed herein. The computer system 800 can further include a network interface device 838 to communicate over the network 820.

The data storage system 818 can include a machine-readable storage medium 824 (also known as a computer-readable medium) on which is stored one or more sets of instructions 828 or software embodying any one or more of the methodologies or functions described herein. The instructions 828 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 18 of FIG. 1.

In one embodiment, the instructions 828 include instructions to implement functionality corresponding to the host event notification component 113 of FIG. 1. While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system, comprising:
   a memory device;
   a reset signal decoder circuit to output a decoded reset signal at a first logical level responsive to receiving, from a host, an input reset signal transitioning to a second logical level; and
   a processing device, operatively coupled to the reset signal decoder, the processing device to:
      receive the decoded reset signal from the reset signal decoder circuit, wherein the decoded reset signal comprises a first bit sequence and a second bit sequence, wherein the first bit sequence matches a predefined reset signal identifying pattern;
      identify a host event specified by the second bit sequence; and
      process the identified host event.

2. The system of claim 1, wherein the reset signal decoder circuit further comprises a digital filter to pass reset signal pulses having at least a predetermined width.

3. The system of claim 1, wherein the host event is a battery charging event, and wherein processing the host event comprises performing a cache management operation with respect to a cache associated with the memory device.

4. The system of claim 1, wherein the host event is a communication timeout expiration event, and wherein processing the host event comprises storing, on the memory device, at least part of a state of the system.

5. The system of claim 1, wherein the host event is a debugging event, and wherein processing the host event comprises storing, on the memory device, at least part of a state of the system.

6. The system of claim 1, wherein the reset signal decoder circuit implements a Universal Asynchronous Receiver/Transmitter (UART) interface.

7. A system, comprising:
   a non-volatile memory device;
   a volatile memory device comprising a cache of the non-volatile memory device;
   a reset signal decoder circuit to output a decoded reset signal at a first logical level responsive to receiving, from a host, an input reset signal transitioning to a second logical level;
   a processing device, operatively coupled to the volatile memory device and the non-volatile memory device, the processing device to:
      receive, from the reset signal decoder circuit, the decoded reset signal, wherein the decoded reset signal comprises a first bit sequence and a second bit sequence, wherein the first bit sequence matches a predefined reset signal identifying pattern;
      determine that the second bit sequence of the decoded reset signal matches a predefined pattern identifying a host battery charging event; and
      perform a cache management operation with respect to the cache.

8. The system of claim 7, wherein the decoded reset signal further comprises a second host event code referencing a communication timeout expiration event, and wherein processing a host event identified by the second host event code comprises storing, on the non-volatile memory device, at least part of a state of the system.

9. The system of claim 7, wherein the decoded reset signal further comprises a second host event code referencing a debugging event, and wherein processing a host event identified by the second host event code comprises storing, on the non-volatile memory device, at least part of a state of the system.

10. The system of claim 7, wherein receiving the input reset signal is performed via a Universal Asynchronous Receiver/Transmitter (UART) interface.

11. The system of claim 7, wherein the reset signal decoder circuit further comprises a digital filter to pass reset signal pulses having at least a predetermined width.

12. A system, comprising:
    a non-volatile memory device;
    a volatile memory device;
    a reset signal decoder circuit to output a decoded reset signal at a first logical level responsive to receiving, from a host, an input reset signal transitioning to a second logical level; and
    a processing device, operatively coupled to the reset signal decoder, the processing device to:
       receive the decoded reset signal from the reset signal decoder circuit, wherein the decoded reset signal comprises a first bit sequence and a second bit sequence, wherein the first bit sequence matches a predefined reset signal identifying pattern;
       determine that the second bit sequence of the decoded reset signal matches a predefined pattern identifying a debugging event; and
       store, on the non-volatile memory device, at least part of a state of the system.

13. The system of claim 12, wherein the reset signal decoder circuit further comprises a digital filter to pass reset signal pulses having at least a predetermined width.

14. The system of claim 12, wherein the decoded reset signal further comprises a second host event code referencing a communication timeout expiration event, and wherein processing a host event identified by the second host event code comprises storing, on the non-volatile memory device, at least part of the state of the system.

15. The system of claim 12, wherein the decoded reset signal further comprises a second host event code referencing a battery charging event, and wherein processing a host event identified by the second host event code comprises performing a cache management operation with respect to a cache associated with the non-volatile memory device.

16. The system of claim 12, wherein the reset signal decoder circuit is further to:
    synchronize a first clock signal with a second clock signal received from the host.

17. The system of claim 12, wherein the reset signal decoder circuit implements a Universal Asynchronous Receiver/Transmitter (UART) interface.

* * * * *